Nov. 19, 1940.   A. TROST   2,222,451
METHOD FOR COMPENSATING THE FLUCTUATIONS IN RAY DOSES
Filed July 20, 1938

Inventor:
Adolf Trost

Patented Nov. 19, 1940

2,222,451

UNITED STATES PATENT OFFICE 2,222,451

METHOD FOR COMPENSATING THE FLUCTUATION IN RAY DOSES

Adolf Trost, Berlin-Steglitz, Germany, assignor to Gesellschaft zur Förderung Zerstörungsfreier Prüfverfahren e. V., Berlin-Dahlem, Germany Application July 20, 1938, Serial No. 220,411
In Germany March 24, 1938

5 Claims. (Cl. 250—83)

This invention relates to a method for compensating the fluctuations of the instantaneous values of quantitatively measured ray doses caused by fluctuations in the network voltage, to which the apparatus producing the rays is connected, and, especially of instantaneous values of Röntgen ray doses measured with counter tubes, (Geiger-Müller-counters) in the testing of materials without destroying them.

Particularly in the last mentioned range of application, wherein Röntgen rays are used according to the well known penetration radiation method, the great dependency of the Röntgen rays upon the voltage of the network makes itself disagreeably apparent when it is a question of registering the Röntgen rays with an indicating instrument such as a counter tube (instrument with direct indication). The measuring of the ray intensity is then effected by the measuring of voltages (electrometer) or currents (amplifier output), which are proportional to the ray intensity. Alterations in the Röntgen ray intensity and consequently in the deflections on the measuring instrument indicating the instantaneous values, due to fluctuations in the networks voltage, cannot therefore lead one to suppose existing differences in material.

These objections are overcome according to the invention in that compensation voltages or currents are produced fluctuating with the network voltage in the same manner as the ray dose to be measured, and these compensation voltages or currents are connected in opposition to the measuring voltage or current serving for the indication of the ray dose. In the instance in question only differences in material but not alterations in the network voltage can therefore cause alterations in the deflections on the instruments.

The compensation voltage may be produced, for example, by dividing the rectified networks voltage into a large voltage component free from fluctuations for example by means of a glow valve, and a smaller component fluctuating with the network voltage and serving for effecting the compensation.

A second possibility consists, for example, in producing the compensation voltage by dividing the alternating voltage taken from the network into a fluctuating component and, for example, by means of an iron hydrogen resistance into a constant component, which components are both rectified and connected in opposition.

Two embodiments of the invention are illustrated diagrammatically one in each of the two figures of the accompanying drawing.

Figure 1:
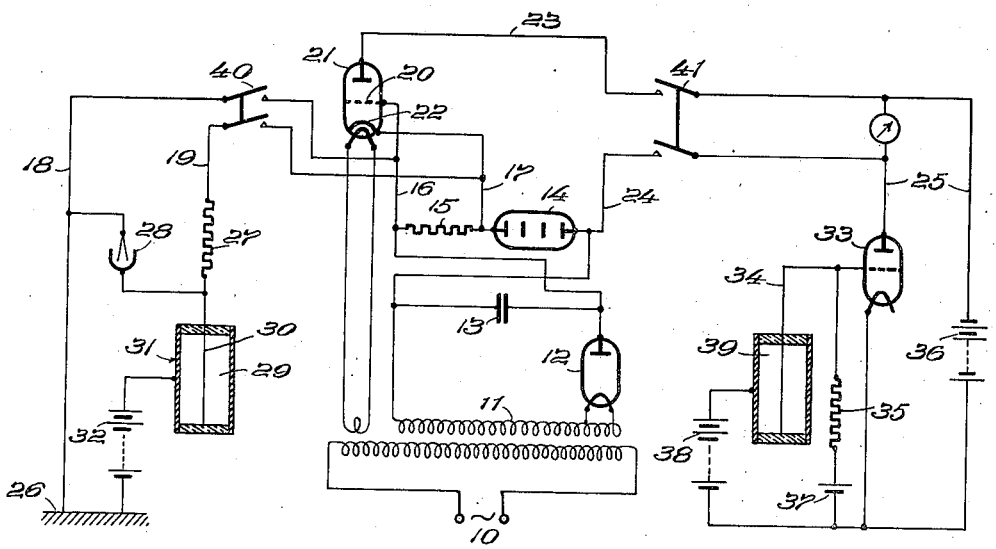

In the middle of Fig. 1 an electric arrangement for producing a compensation voltage or compensation current connected to the fluctuating network voltage 10 is shown. On the left and right of this arrangement ray dose measuring arrangements are shown. On the left side the measurement of the ray intensity is obtained from the measurement of voltages and on the right side from the measurement of currents.

In the left measuring arrangement 29 designates a counter tube subjected for example to Röntgen rays during the testing of materials without destroying them, according to the known penetration radiation method. The Röntgen tube (not illustrated) for producing the Röntgen rays is operated from the network 10. A high voltage 32 is applied to the two electrodes 30 and 31 of the counter tube in known manner. The "earth" is designated by 26. Under the action of the Röntgen rays on the counter tube 29 the measuring voltage proportional to the intensity of the Röntgen radiation is produced on the leak resistance 27 and is indicated in the electrometer 28. As the network voltage 10, to which the Röntgen tube is connected, fluctuates, the Röntgen ray intensity and the voltage indicated on the electrometer also fluctuates, which is not desired. These fluctuations in voltage as mentioned in the introductory paragraphs, may lead one to suppose the existence of a defect in the material when testing material without destroying the same by the Röntgen ray penetration method. This voltage prevailing between the lines 18 and 19 and indicated on the electrometer 28 is, according to the invention, connected by a switch 40 in opposition to a compensation voltage which fluctuates with the same value as the voltage indicated on the electrometer 28. The middle portion of Fig. 1 shows how this compensation voltage is produced. The fluctuating network voltage 10 is rectified by a transformer 11 and a rectifier tube 12 and produces on the condenser 13 a fluctuating continuous voltage. The greater portion of this continuous voltage is kept absolutely constant by means of a glow voltage stabiliser 14 so that the whole voltage fluctuation lies on the two end points of a resistance 15 which is connected in series with the stabiliser 14. This voltage, present on the end points of the resistance 15 and fluctuating with the net voltage, is connected by a switch 40 as stated in opposition to the voltage prevailing between the lines 18 and 19 also fluctuating with the network voltage but in the opposite sense. The fluctuations of the voltages connected in opposition are made of the same value by the selection of the resistance 15 which is preferably constructed as a potentiometer. The resultant voltage between the terminals of the measuring instrument 28 is then free from the fluctuations in the network.

The right half shows a ray measuring arrangement which differs from that shown on the left half of Fig. 1 only in that the radiation measuring is obtained from the current measuring. The counter tube acted upon by the Röntgen rays is again designated by 39 and the service voltage applied thereto by 38. The drop in potential at the leak resistance 35, which is proportional to the ray intensity, is located between the grid and the cathode of an amplifier tube 33, to which the anode voltage 36 is applied. A grid battery is designated by 37. The anode current of the tube 33 flows through a measuring instrument connected up in the anode circuit 25. The anode current fluctuates with the network voltage just like the Röntgen beam impinging on the counter tube. To this anode current a compensation current fluctuating with the same value is, according to the invention, connected in opposition to this anode current by means of a switch 41, namely the anode current of an amplifier tube 21, to whose grid 20 and cathode 22 the fluctuating continuous current prevailing between the ends of the resistance 15 has been applied. The resulting indication on the measuring instrument located in the circuit 25 is, in this manner, free from the fluctuations of the net.

Figure 2:
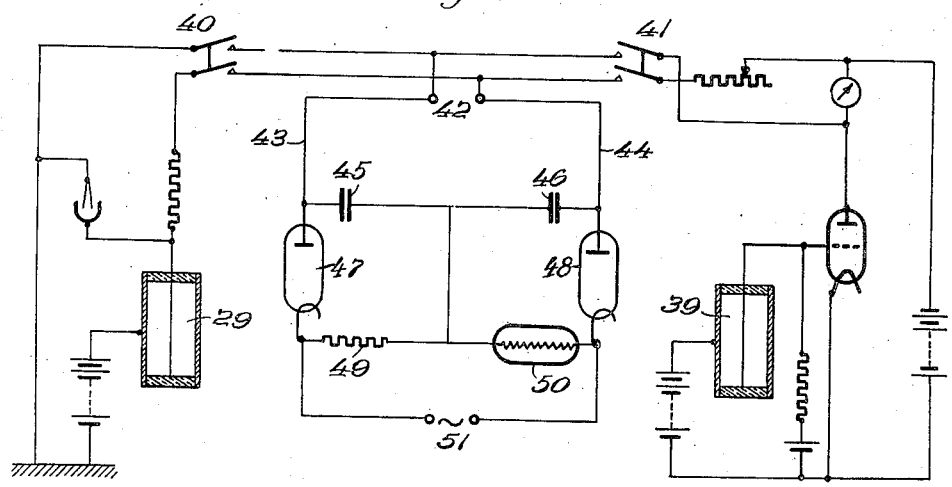

In Fig. 2 the measuring instruments illustrated on the right and left correspond with those shown in Fig. 1, so that they do not require further explanation. Merely the middle part represents another means for producing the compensation voltage or compensation current.

Here the network voltage 51 is split up into two approximately equally large components by series-connecting an iron-hydrogen resistance 50 and an ordinary resistance 49 of suitable size, one of which components takes up the whole of the network voltage fluctuation whereas the other remains constant. These voltages are rectified by means of rectifier valves 47 and 48 and connected in opposition through condensers 45 and 46 and wires 43, 44 so that at 42 a small voltage fluctuating strongly with the network voltage or when a suitable resistance (not shown) is introduced, a current fluctuating with the network voltage is obtained, which voltage or current can be added (see Fig. 1) to the measuring voltage or to the measuring current so that fluctuations in the measuring voltage or in the measuring current, are just compensated.

It is again pointed out, that the inventive idea may be applied generally wherever fluctuations of quantitatively measured instantaneous ray dose values may occur due to the fluctuations in the voltage of the network.

I claim:

1. Method for compensating the fluctuations of instantaneous values of quantitatively measured ray doses represented by measuring current values of a ray measuring instrument caused by fluctuations in the network voltage, to which the instrument producing the rays is connected, especially instantaneous values of Röntgen ray doses measured with counter tubes (Geiger-Müller-counters), for the testing of materials without destroying them, consisting in producing a compensation current fluctuating with the network voltage in the same manner as the measuring current representing the ray dose to be measured and which is emitted by the instrument producing the rays and connected to the network voltage, said compensation current being produced by opposite connecting of a constant voltage and of a voltage fluctuating with the network voltage, and connecting said compensation current in opposition to the measuring current serving for the indication of the ray dose.

2. Method for compensating the fluctuations of instantaneous values of quantitatively measured ray doses represented by measuring current values of a ray measuring instrument caused by fluctuations in the network voltage, to which the instrument producing the rays is connected, especially instantaneous values of Röntgen ray doses measured with counter tubes (Geiger-Müller-counters), for the testing of materials without destroying them, consisting in producing a compensation current fluctuating with the network voltage in the same manner as the measuring current representing the ray dose to be measured and which is emitted by the instrument producing the rays and connected to the network voltage, said compensation current being produced by dividing up the rectified network voltage into a large voltage component free from fluctuations and into a small component fluctuating with the network voltage and serving for effecting the compensation current, and in connecting said compensation current in opposition to the measuring current serving for the indication of the ray dose.

3. Method for compensating the fluctuations of instantaneous values of quantitatively measured ray doses represented by measuring current values of a ray measuring instrument caused by fluctuations in the network voltage, to which the instrument producing the rays is connected, especially instantaneous values of Röntgen ray doses measured with counter tubes (Geiger-Müller-counters), for the testing of materials without destroying them, consisting in producing a compensation current fluctuating with the network voltage in the same manner as the measuring current representing the ray dose to be measured and which is emitted by the instrument producing the rays and connected to the network voltage, said compensation current being produced by dividing up the rectified network voltage into a large voltage component free from fluctuations and into a small component fluctuating with the network voltage, in controlling the anode current of an amplifier tube by said small component, and in connecting said compensation anode current in opposition to the measuring current serving for the indication of the ray dose.

4. Method for compensating the fluctuations of instantaneous values of quantitatively measured ray doses represented by measuring current values of a ray measuring instrument caused by fluctuations in the network voltage, to which the instrument producing the rays is connected, especially instantaneous values of Röntgen ray doses measured with counter tubes (Geiger-Müller-counters), for the testing of materials without destroying them, consisting in producing a compensation current fluctuating with the network voltage in the same manner as the measuring current representing the ray dose to be measured and which is emitted by the instrument producing the rays and connected to the network voltage, said compensation current being produced by dividing up the alternating network voltage into a voltage component free from fluctuations and a fluctuating voltage component, in rectifying the two components and connecting them in opposition and in connecting the compensation current produced by the resultant fluctuating voltage in opposition to the measuring current serving for the indication of the ray dose.

5. Method for compensating the fluctuations of instantaneous values of quantitatively measured ray doses represented by measuring current values of a ray measuring instrument caused by fluctuations in the network voltage, to which the instrument producing the rays is connected, especially instantaneous values of Röntgen ray doses measured with counter tubes (Geiger-Müller-counters), for the testing of materials without destroying them, consisting in producing a compensation current fluctuating with the network voltage in the same manner as the measuring current representing the ray dose to be measured and which is emitted by the instrument producing the rays and connected to the network voltage, said compensation current being produced by opposite connecting of a constant voltage and of a voltage fluctuating with the network voltage, and connecting said compensation current in opposition to the measuring current serving for the indication of the ray dose, the circuit which contains the ray measuring instrument comprising a resistance and a voltmeter, and the compensation circuit, which is opposite connected to the circuit containing said ray measuring instrument, comprising a second resistance.

ADOLF TROST.